Sept. 7, 1965  P. V. OSBORN, JR  3,205,117
GARMENT BAG ROLL PERFORATING AND SEALING MACHINE
Filed Sept. 20, 1961  9 Sheets-Sheet 1

INVENTOR
PAUL V. OSBORN, JR.
BY E. J. Berry
ATTORNEYS

Sept. 7, 1965 P. V. OSBORN, JR 3,205,117
GARMENT BAG ROLL PERFORATING AND SEALING MACHINE
Filed Sept. 20, 1961 9 Sheets-Sheet 2

INVENTOR
PAUL V. OSBORN, JR.
BY E. J. Berry
ATTORNEYS

Sept. 7, 1965 P. V. OSBORN, JR 3,205,117
GARMENT BAG ROLL PERFORATING AND SEALING MACHINE
Filed Sept. 20, 1961 9 Sheets-Sheet 3

INVENTOR
PAUL V. OSBORN, JR.
BY E. J. Berry
ATTORNEYS

Sept. 7, 1965 P. V. OSBORN, JR 3,205,117
GARMENT BAG ROLL PERFORATING AND SEALING MACHINE
Filed Sept. 20, 1961 9 Sheets-Sheet 4

INVENTOR
PAUL V. OSBORN, JR.
BY E. J. Berry
ATTORNEYS

Sept. 7, 1965 P. V. OSBORN, JR 3,205,117
GARMENT BAG ROLL PERFORATING AND SEALING MACHINE
Filed Sept. 20, 1961 9 Sheets-Sheet 6

INVENTOR
PAUL V. OSBORN, JR.
BY E. J. Berry
ATTORNEYS

Sept. 7, 1965 P. V. OSBORN, JR 3,205,117
GARMENT BAG ROLL PERFORATING AND SEALING MACHINE
Filed Sept. 20, 1961 9 Sheets-Sheet 7
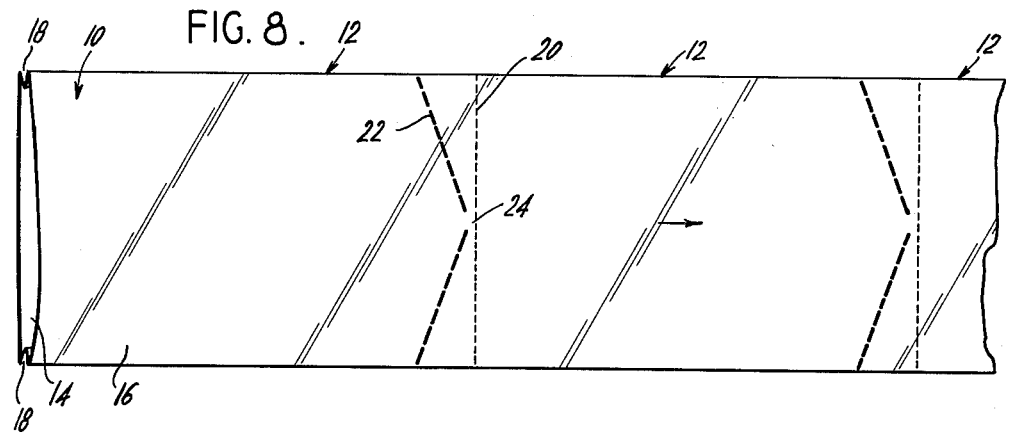
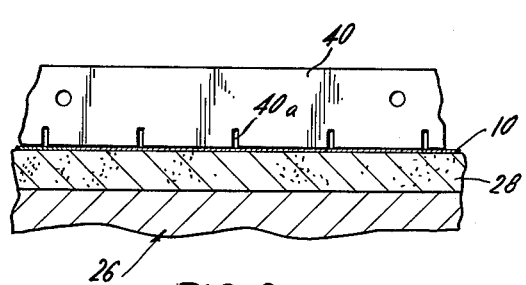
FIG. 9.
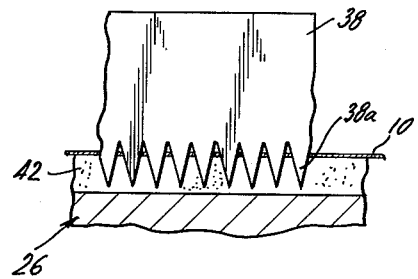
FIG. 10.
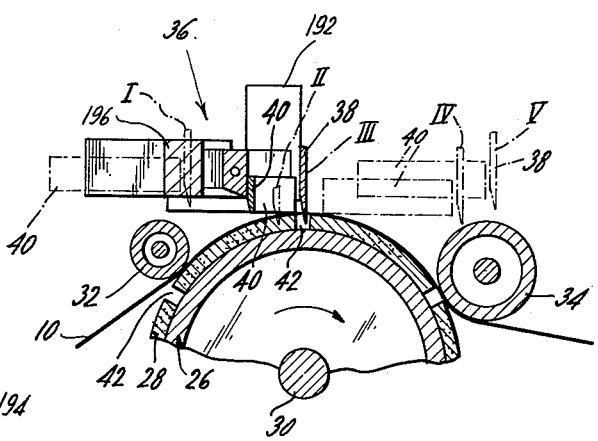
FIG. 11.
FIG. 12.
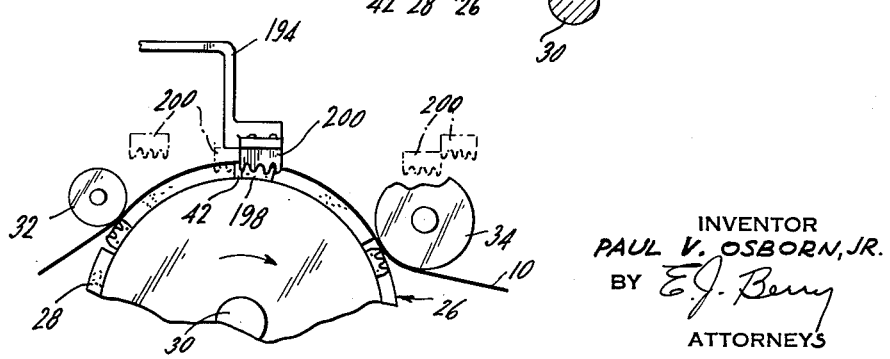
INVENTOR
PAUL V. OSBORN, JR.
BY E. J. Berry
ATTORNEYS Sept. 7, 1965 P. V. OSBORN, JR 3,205,117
GARMENT BAG ROLL PERFORATING AND SEALING MACHINE
Filed Sept. 20, 1961 9 Sheets-Sheet 8

$B < A$
$C = 2A - 2B$
$\dfrac{2B + C}{2} = A$

INVENTOR
PAUL V. OSBORN, JR
BY E. J. Berry
ATTORNEYS

Sept. 7, 1965     P. V. OSBORN, JR     3,205,117

GARMENT BAG ROLL PERFORATING AND SEALING MACHINE

Filed Sept. 20, 1961     9 Sheets-Sheet 9

$$\frac{2B-C}{2} = D$$

$$\frac{2B+C}{2} = A$$

$$D < A$$

INVENTOR
PAUL V. OSBORN, JR.
BY E. J. Berry
ATTORNEYS

United States Patent Office 3,205,117
Patented Sept. 7, 1965

3,205,117
GARMENT BAG ROLL PERFORATING AND
SEALING MACHINE
Paul V. Osborn, Jr., Rochester, N.Y., assignor to National
Distillers and Chemical Corporation, New York, N.Y.,
a corporation of Virginia
Filed Sept. 20, 1961, Ser. No. 139,529
5 Claims. (Cl. 156—513)

The present invention is related to continuous, in-line manufacturing operations performed on continuously moving work material. Specifically, the present invention is concerned with a machine and method for the continuous-flow production of thermoplastic garment bags from a length of thermoplastic tubing.

The advent of thermoplastic film materials, such as the well known polyethylene film, has resulted in a large variety of new and superior packaging units wherein thermoplastic film is heat-sealed in package configurations designed to afford maximum protection for the item within the package. One of the most widely used of these packages is the thermoplastic garment bag used both for protection of freshly laundered clothing and for the protection of new clothing in retail stores. The illustrative embodiment of the present invention disclosed herein is a machine and method for the manufacture of such garment bags.

Although thermoplastic garment bags have achieved a wide measure of commercial success, there has existed a substantial need for a machine and method for the production of those bags which eliminated many of the disadvantages found in the prior art methods. The successful use of these garment bags requires that the individual bags be of relatively low cost, that they be relatively easy to place around garments in the often crowded and hectic environment of a commercial dry cleaning establishment, and that the equipment for handling the bags be relatively inexpensive. In the past, these bags were manufactured in generally three different ways. The first was to provide a small bag-making machine in the dry cleaning establishment which used a continuous length of thermoplastic tubing as its raw material. A length of tubing was drawn downwardly around a garment and mechanisms were then activated to seal and cut the upper surface of the garment, above the level of the hanger holding the garment, thereby to complete a finished garment bag. Although this method of distribution had marked advantages, the required equipment was relatively expensive and the proprietors of the dry cleaning establishment often encountered difficulty in working the machinery.

The second generally employed method was the sale of individual pre-manufactured bags which were packaged in multiple units. These bags could either be used one at a time by the proprietor or could be used in connection with a dispensing hopper. This method similarly had its advantages. However, much difficulty was encountered due to the propensity of the individual garment bags to stick to each other within the dispensing hopper.

A third method involves the use of a continuous roll of pre-formed garment bags which are attached to each other in end to end relationship at a line of perforations. The roll of garment bags may be conveniently mounted above the shoulder height of working personnel such that one bag at a time may be drawn down upon a garment to be protected and then easily torn from the remainder of the roll. The mechanisms required to mount the roll, obviously, are extremely simple and in practice it has been found that virtually no difficulty is encountered in using such a method of distribution.

Machines for the manufacture of a roll of garment bags in end to end relationship are currently available and have been patterned in general after bag making machines which have long been used in the paper product art. These machines generally involve a series of rollers under which the work material passes. The various rollers cut, heat seal and perforate at each revolution thus performing all the necessary functions on the work material passing thereunder to complete a series of end attached bags. It is obvious to one skilled in the art that only bags of one particular length may be manufactured in such machines. The length of the bag is, of course, governed by the diameter of the roll carrying the work head. If a perforating roller is 30 inches in diameter, bags of 30 inch length will be produced. Thus, where bags of different lengths were to be manufactured, a plurality of machines were required. Accordingly, a significant need existed for the production of a machine which could manufacture garment bags, on a continuous in-line production basis, wherein the machine could be adapted to make garment bags of various differing lengths. The present invention has, as one of its objectives, the provision of such a machine. In general, it is the object of the present invention to provide a machine and method for the manufacture of individual garment bags on a successive continuous flow manufacturing basis. More broadly stated, it is an object of the present invention to provide a machine to perform work function on continuously moving material at spaced points along the length of that material wherein the distance between those points is variable by suitable adjustments to the machine.

The present invention has as a still further object, the provision of a method for the manufacture of garment bags on a continuous flow basis wherein bags of differing lengths may be produced by simple mechanical adjustment of the means for manufacture.

It is additionally within the contemplation of the present invention to provide means for the manufacture of thermoplastic garment bags wherein the unit cost of each bag is held to a minimum and wherein the individual bags are provided in end to end attachment in a continuous roll such that they may be conveniently and efficiently utilized in dry cleaning establishments.

In accordance with an illustrative embodiment of the present invention disclosed herein there is provided a machine for the manufacture of thermoplastic garment bags and there is described a method for that manufacture. The machine herein disclosed generally provides means for advancing a length of thermoplastic film tubing through a machine at a prescribed linear velocity. The tubing is passed over a work-receiving roller which is driven such that its surface velocity is equal to the linear velocity of the tubing. A perforating and sealing head is provided with appropriate perforating and sealing blades and is mounted for compound movement including motion components tangentially and radially of the work-receiving roller. Actuating means are provided to move the head at the surface velocity of the roller and to move the head into a cooperating working relationship therewith to contact the tubing between the head and the roller. Longitudinal clearance grooves are provided in the surface of the roller which co-acts with the sealing blade thereby to form perforations and seals at spaced locations along the length of the tubing. Control means are provided for the actuating means such that the head is moved, during the work phase, at the tangential velocity of the work-carrying roller and further, that the head is then returned during a return phase of greater duration than the work phase to allow a predetermined length of material to pass over the work-receiving roller prior to the next work phase. The control means are adjustable such that the length of the return phase is variable thereby providing means to vary the length of tubing which passes over the work-receiving roller between successive work phases thereby to vary the linear length of the garment bags produced.

The method according to the present invention involves the steps of moving a length of thermoplastic tubing at a prescribed velocity through a work zone and moving a work head in a path parallel to the tubing at that linear velocity during a work phase. The method then prescribes that the the work head is moved into contact with the tubing in the work zone to form the required seals and perforations. The work head is then moved out of contact with the tubing and in the opposite direction during a return phase. Variations in the length of garment bags produced by this method may be accomplished by varying the length of the return phase with respect to the work phase, but retaining the equality of velocities during the work phase between the work head with the linear velocity of the thermoplastic tubing.

The above brief description, as well as further objects, features and advantages of the present invention will be best appreciated by reference to the following detailed description of a presently preferred embodiment when taken in conjunction with the accompanying drawings wherein:

FIG. 8 is a plan and diagrammatical view of a portion of the length of the finished product of the present machine illustrating a series of end attached garment bags;

FIG. 9 is a detail and partially sectional view of the sealing blade employed in the present invention in contact with the thermoplastic film and work-receiving roller;

FIG. 10 is a similar view to FIG. 9 illustrating the perforating blade;

FIG. 11 is a sectional and diagrammatical view of the work head in relationship to the work-receiving roller with various positions of the work head shown in phantom;

FIG. 12 is a view similar to that shown in FIG. 11 illustrating the interengagement of the positive alignment means between the work receiving roller and the work head;

FIG. 13 illustrates the machine set up for the operation of a basic length garment bag, herein arbitrarily chosen as 30 inches in length, and with the mechanisms shown at the middle of the work phase of the machine cycle;

FIG. 14 illustrates the mechanisms as set for an operation to manufacture bag of longer length, here 54 inches, with the various mechanisms shown during the work phase of the machine cycle;

FIG. 15 shows the adjustments for the same operations as shown in FIG. 14, i.e. the manufacture of a 54 inch length bag, with the various members shown in their respective positions during the return phase or backstroke of the work head;

Figure 13:
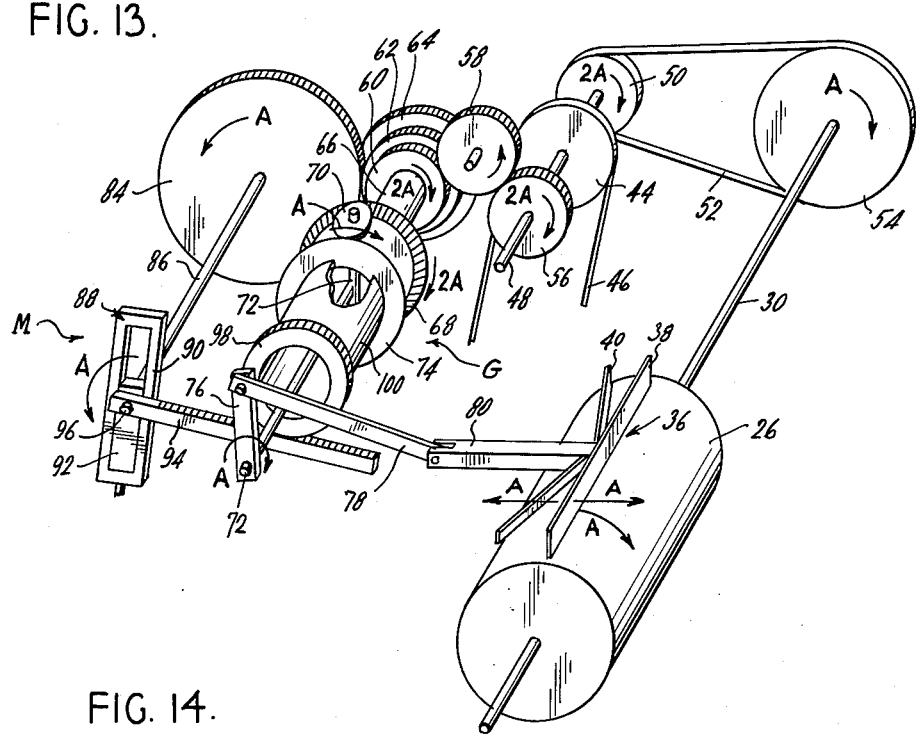
FIGS. 13, 14 and 15 are perspective and schematic showings of the drive means for the work-receiving roller and the work head, the control means for the work head and the adjustment means for those control means illustrating the mechanisms in various portions of the work cycle and in various adjustments. Specifically.
Figure 14:
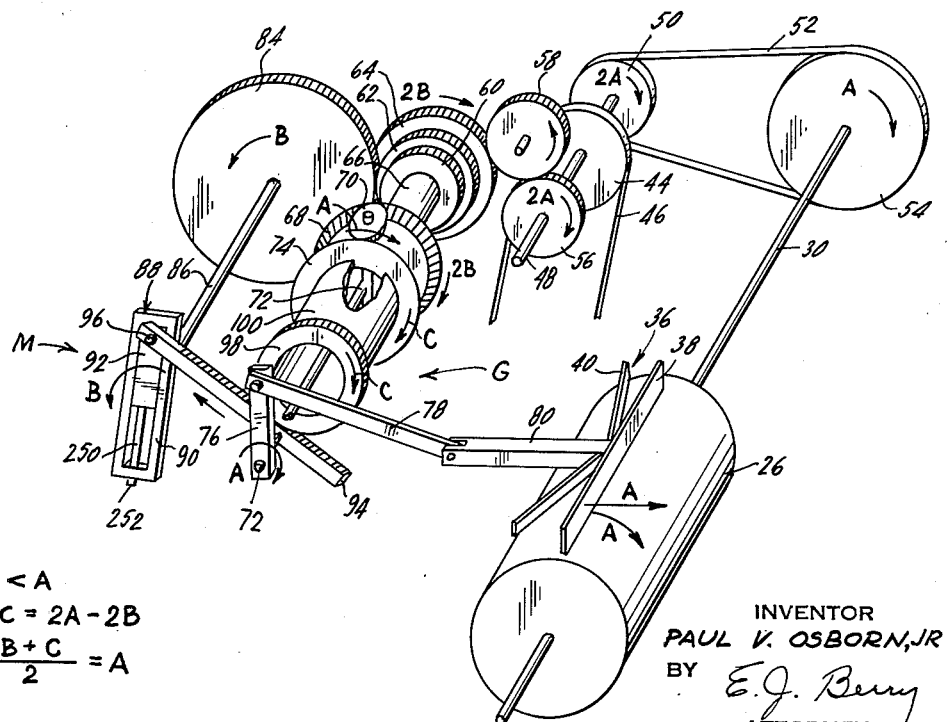
Figure 15:
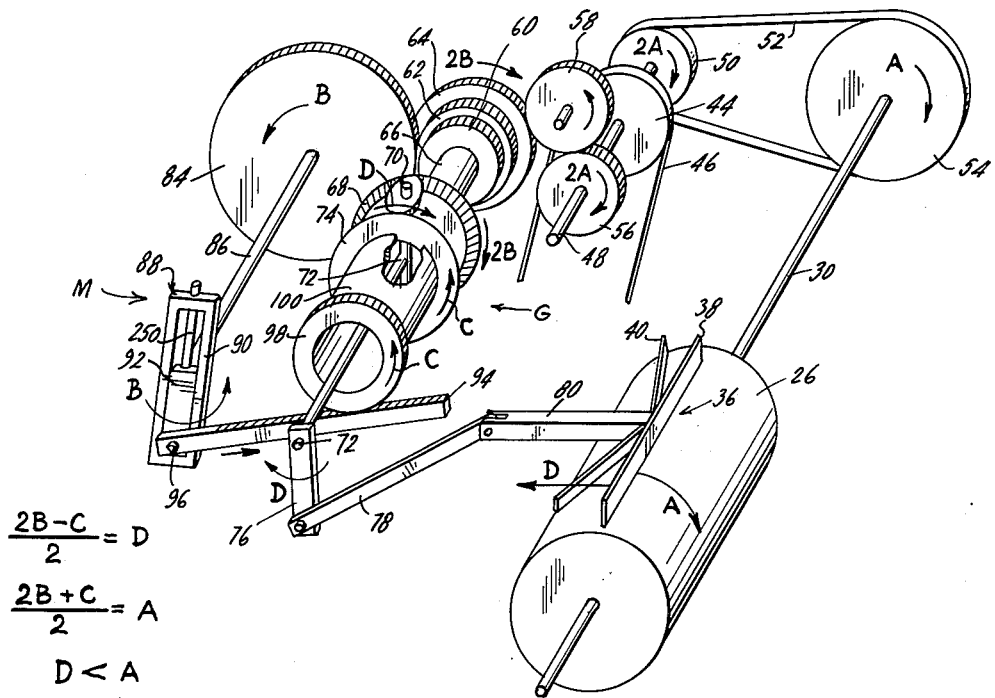
Figure 16:
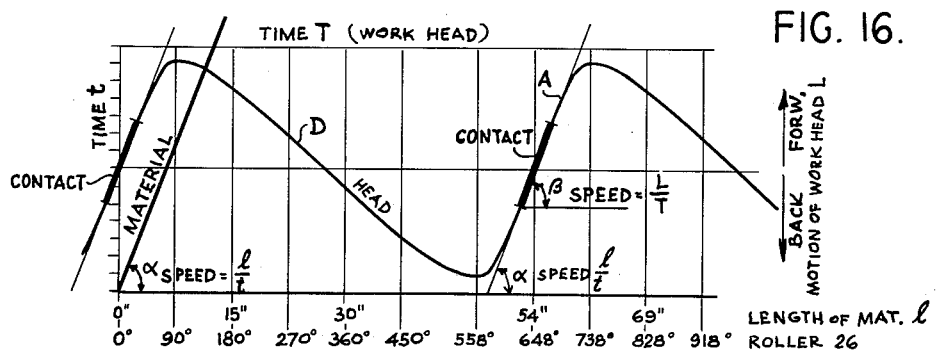
Figure 17:
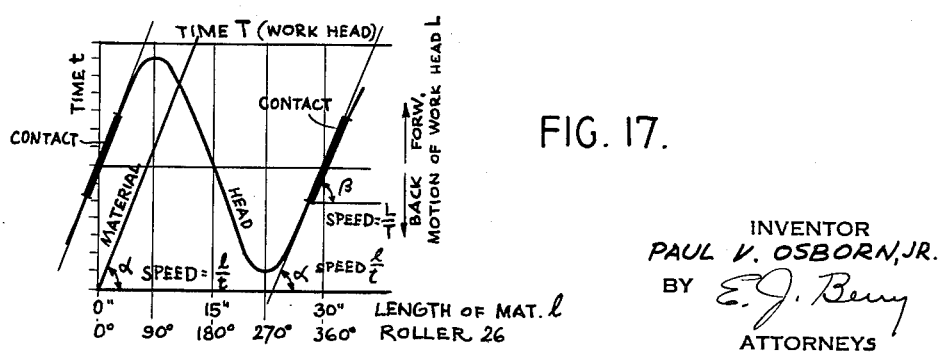

FIG. 16 is a graphical representation of the movement of the work material, the work-receving roller and the work head where the mechanisms are set up for a longer length bag as shown in FIGS. 14 and 15; and FIG. 17 is a drawing similar to FIG. 16 showing the relationship of the work head, the work material and the work-receiving roller when the machine is set up to produce the shortest length bag, i.e. when the mechanisms are in position diagrammatically illustrated in FIG. 13.

Prior to giving a detailed description of the various interengaging components of the garment bag perforating and sealing unit described in FIGS. 1 through 7, and 9 through 12, reference will be made to FIG. 8 for a description of the product produced and FIGS. 9 through 11 and 13 through 17 for a general description of the manufacturing process and the bag perforating and sealing machinery.

Referring now to FIG. 8, there is illustrated a length of thermoplastic tubing 10 which comprises the work material from which the individual garment bags 12 are formed. The tubing 10 is flattened out to provide a back layer 14 and a top layer 16 separated by appropriate fold lines 18 which may be of the accordion configuration as illustrated in FIG. 8. The individual garment bags 12 are separated from each other by a line of perforations 20. The top edge of the bag 12 is formed by a pair of angled shoulder lines 22 at which the top and bottom layers, 14, 16 are welded together. The shoulder lines 22 converge at the center of the garment bag 12 at the upward facing hanger opening 24 which is adapted to receive the conventional hanger hook.

Generally, the individual bags 12 which are connected in end to end relation across the lines of perforations 20 are manufactured by passing a continuous length of tubing 10 through a work area at which a work head is effective to form the transverse lines of perforations as at 20 and to seal the top and bottom layers together at the shoulder lines 22. The continuous length of tubing 10, which then consists of individual garment bags 12, secured in end to end relation, may then be rolled up for shipment, storage and subsequent use.

A general understanding of the mechanism which produces the perforation lines 20 and the sealed shoulder lines 22 may be obtained by making reference to FIGS. 9, 10 and 11. In FIG. 11 there is shown a work-receiving roller 26 which is provided with a surface material 28. The work-receiving roller 26, which provides and defines a work zone, is mounted on a shaft 30 which is driven at a predetermined speed as will be described more fully below. The work material 10 is engaged against a portion of the periphery of the wheel 26 by contact with the idler wheel 32 at its entry and the idler wheel 34 at the point in which the work material 10 leaves the work-receiving roller 26. A perforating and sealing head or work head 36 is mounted for compound movement with respect to the work-receiving roller 26. The work head 36 carries a serrated perforating blade 38 and a serrated sealing bar 40 which are mounted in an angled position with respect to each other to produce the pattern of the perforations 20 and the shoulder lines 22 on the individual garment bags 12 as seen in FIG. 8. In FIG. 11, various positions of the work head 26 are shown as it comes in contact with the work material 10. In the first position illustrated and labeled I, the work head 36 is shown in its first position prior to engagement with the work material 10 and the work-receiving roller 26. The notation II illustrates the position of the perforating blade 38 on the work head 36 as the work head is moved radially toward the work-receiving roller 26 and tangentially into engagement with the work material 10. In the solid line configuration of the work head 36 as shown in FIG. 11 and labeled position III, the work head 36 is shown at a position directly above the center of the work-receiving roller 26 and is moving with a linear velocity, in a direction tangential to the roller 26, at a rate of speed equal to the surface velocity of the roller 26 and therefore, equal to the linear velocity of the moving work material 10. As may be seen, the perforating knife blade 38 is extended through both layers of the work material 10 to form perforations as shown at 20. A plurality of longitudinal clearance grooves 42 are formed at locations equally spaced about the circumference of the work-receiving roller 26 to receive the tips 38a of the perforating blade 38 during the work phase of the motion of the work head 36. The reception of the perforating blade 38 through the work material 10 and into the clearance grooves 42 is shown in FIG. 10. It will be noted that as the work head 36 moves tangentially of the work receiving roller 26, the sealing bar 40, which is formed with serrations 40a, engages with the work material 10 and, as movement continues, the work 10 is sealed by pressure and heat between the sealing bar 40 and the surface material 28 of the work-receiving roller 26 as is illustrated in FIG. 9.

The notation IV indicates the position of the work head 36 after completion of the work phase and the notation V indicates the position of the work head as it is moved upwardly away from the work-receiving roller 26. The work head 36 is then moved rearwardly in a return phase to its first position. The cycle is then repeated again to perforate and seal the work material 10 at a new location. It will be realized that the work-receiving roller 26 is rotated at a predetermined rate and the work head 36 is moved at a velocity equal to the surface velocity of the roller 26 such that the work head 36 engages with the work material 10 and is in an operative relationship with the work-receiving roller 26 during the work phase. It will be further realized that the length of time necessary for the work head 36 to move from the position of notation IV through to the position of notation I will determine the amount of work material 10 which passes over the work-receiving roller 26 and will therefore govern the length of the individual bags 12.

From the foregoing, it will be appreciated that a continuous length of end to end attached garment bags may be made by the cyclical movement of the perforating and sealing head 36 coming into and out of engagement with work material 10 as it is passed at a uniform velocity over the roller 10. It will be appreciated that it is required to provide means for the coordinated movement of the work head 36 into and out of engagement with the work-receiving roller 26 such that the linear velocity of the work head 36 equals the surface velocity of the roller 26 and such that the cutting blade 38 is received within the provided clearance grooves 42 of the roller 26.

As stated above, it is one of the objects of the present invention to provide a machine which may be adjusted to provide garment bags of the type shown in FIG. 8 in a variety of lengths depending upon the adjustments made to the bag making machine. In FIGS. 13, 14 and 15 the drive and the control mechanisms for the movement of the work-receiving roller 26 and the work head 36 are schematically illustrated for the manufacture of garment bags of differing length. For purposes of illustration, the following description of the control and drive means and the then following detailed description of the bag making machine will be for a machine for the manufacture of relatively short bags of a 30 inch length, long bags of a 54 inch length and medium bags of a 36 inch length. It will be appreciated that machines according to the present invention may be manufactured for the production of garment bags of a variety of differing lengths.

Referring now to FIGS. 13 through 15, it will be seen that power is delivered to a main drive sprocket 44 by means of the link chain 46. The drive sprocket 44 is rigidly secured to a shaft 48 on which is mounted a sprocket which in turn drives a link chain 52 which is connected at its other end to a sprocket 54 twice the diameter of the sprocket 50. The sprocket 54 is mounted on the roller shaft 30 (seen in FIG. 10) and thereby drives the work-receiving roller 26 at a rate of speed equal to one-half the speed of the main drive shaft 48. This is indicated by the notations 2A on the sprocket 50 and the notation A on the sprocket 54. Note that the curved arrow A, on the surface of the work-receiving roller 26 indicates a surface velocity of A (presuming a radius of one unit).

Further referring to FIG. 13 for a description of the drive means for the work head 36, there is seen the main drive gear 56, mounted on the main drive shaft 48, which is engaged with the idler and speed change gear 58. The idler and speed change gear 58 is then engaged with one of the three driven gears 60, 62, 64 of a differential gear unit G which are all rigidly mounted on the shaft 66. In the illustrative machine disclosed herein, the gear 60 is used when a 30 inch bag is manufactured; the gear 62 is used when a 36 inch bag is manufactured; and, the gear 64 is used for the manufacture of a 54 inch bag. As may be seen, the idler and speed change gear 58 is shown in engagement with the 30 inch driven gear 60 for the production of a 30 inch bag.

The differential gear unit is powered from the driven gears 60, 62, 64 through the shaft 66 which has mounted on its inner end the first differential side gear 68 which is engaged in the conventional manner against the differential pinion gears 70 which are mounted in turn for rotation on the differential spider 72. The second differential side gear 74, placed parallel to the first side gear 68, is held stationary when 30 inch bags are manufactured such that the spider 72 is rotated at a rate one-half of that of the first differential side gear 68. Thus, in the drawing of FIG. 13, it is shown that the main drive shaft 48 has a rotation of 2A and a similar rotation of 2A is provided to the shaft 66 and the first differential side gear 68. Therefore, the rotation of the spider is indicated as being A.

The mechanisms to the left of the differential gear unit G comprise the control means M, which, as will be explained in detail below, is positioned in its neutral position, which has no effect upon the drive when the bag making machine is set up to produce a 30 inch garment bag. Therefore, the control mechanism M will not be described in connection with FIG. 13.

The spider 72 extends outwardly from the gear mechanisms and is connected at its outer end to an output crank 76 which revolves about the axis of the spider at the rate A, i.e., one-half the velocity of the input speed. At the outer end of the output crank 76 there is pivotally mounted a connecting rod 78 which is pivoted at its other end to the sliding beam 80 on which is mounted the work head 36. The slide beam 80 is mounted within suitable bearing means, not shown in the diagrammatical figures, to provide a motion tangential to the surface of the work-receiving roller 26. As the spider 72 rotates about its central axis, the output crank 76 drives the slide beam 80, through the connecting rod 78, through a reciprocating movement which, at the point wherein the work head 36 is immediately above the work-receiving roller 26, is equal in velocity to the surface velocity A of the work-receiving roller 26. After the work operation is completed and the work head 36 has been driven over the work-receiving roller 26 to perforate and seal the work material 10, an engagement cam (not shown) slightly raises the work head 36, and the output crank 76 draws the work head 36 toward the left in a return phase to position it for the start of a new work cycle.

When it is desired to manufacture a garment bag of a length greater than 30 inches, adjustments must be made to vary the length of time of the return phase of the work head 36. The speed of the work head 36 must be maintained at the surface speed of the roller 26 during the work phase and must be decreased during the return phase. The adjustments to accomplish this result are illustrated in FIG. 14 wherein the mechanisms have been set up to illustrate their arrangement for the manufacture of a fifty-four inch garment bag. As may be seen, the drive means for the work-receiving roller 26 remains the same as illustrated in FIG. 13 for the production of a 30 inch bag. Power is transmitted through the main drive shaft 48 through to the roller shaft 30 such that the work-receiving roller 26 is rotated at a rate of A. The idler and gear shift lever 58 is still engaged with the main drive gear 56, however, it now drives the largest gear 64 on the shaft 66 rather than the small gear 60. The velocity of the driven gear is indicated as 2B and, obviously, the first differential side gear 68 also rotates at a velocity of 2B. As the differential side gear 68 rotates in a clockwise direction with a velocity of 2B, the spider 72 is driven in a clockwise direction at a rotational velocity which is governed by the speed of the second differential side gear 74. If the second differential side gear 74 is stationary, the speed of the first differential side gear will be one-half of 2B, or B. However, since the speed B is less than the speed A (compare FIG. 14 with FIG. 13) and since it is required that the work head 36 during the work phase be driven at a linear velocity of A and that therefore, the output crank 76 and spider 72 rotate at a rate of A, the second differential side gear 74 must be driven in a clockwise direction at a velocity (which is indicated as C) which will be effective to add to the velocity B imparted to the spider by the first differential side gear 68 to drive the spider 72 at a rotational velocity of A. The value of the velocity C which must be imparted to the second differential side gear 74 is determined by the following formulae:

Where $B<A$:

$$C = 2A - 2B$$

$$A = \frac{2B+C}{2}$$

The velocity C is imparted to the second differential side gear during the work phase of the motion of the work head 36 by means of the control mechanism M which is positioned to the left of the differential gear drive G in FIGS. 13, 14 and 15. Power for the control unit M is taken by the driven gear 62 by a power takeoff gear 84 mounted on a speed-change crank shaft 86. The power takeoff gear 84 is twice the diameter of driven gear 62 and, therefore, rotates the crank shaft 86 with a velocity of B. The crank shaft 86 is in turn secured to the speed-change crank 88 and specifically to the rigid frame 90 thereof. Mounted for longitudinal movement within the frame 90 of the speed-change crank 88 is an adjustment block 92 which is pivotally connected to a control rack 94 at the pivot point 96. Due to the adjustable feature of the block 92, the effective crank arm length of the speed-change crank 88 may be varied thereby to vary the reciprocating travel of the control rack 94. In FIG. 13, the adjustment block 92 is shown in a position wherein the pivot 96 of the control rack 94 coincides with the axis of the crank shaft 86. In the position of adjustment shown in FIG. 13, the crank shaft drives the frame 90 of the speed-change crank 88 about the axis of the shaft 86 with no resultant motion to the control rack 94 since the effective crank arm length of the speed-change crank 88 is zero. However, in the position of FIG. 14, the effective crank arm length is maximumized such that the control rack 94 is reciprocated with each rotation of the speed-change crank 88.

The control rack 94 is mounted by suitable bearings such that it is constantly engaged with a differential control gear 98 which is rigidly secured to the second differential side gear 74 by a connecting collar 100. Thus, when the control rack 94 is moved, the control gear 98 and the second differential sidegear 74 is rotated. It will be appreciated that when the control rack 94 is moved to the left, as indicated by the arrow in FIG. 14, the control gear 98 will be rotated in a clockwise direction which will be effective to increase the linear velocity toward the right of the work head 36. Conversely, where the control rack 94 is moved toward the right, as indicated by the arrow in FIG. 15, the differential control gear 98 and the second differential side gear 74 will be rotated in a counterclockwise direction thereby to decrease the clockwise rotation of the spider 72.

The relative sizes of the various above described components of the control mechanism M are such that values result which fulfill the requirements of the foregoing formula when the work head 36 is immediately above the work-receiving roller 26. In FIG. 15, the differential gear mechanisms G and the control mechanism M are illustrated half way through the total cyclical movement of the work head 36 wherein the work head 36 is moving toward the left during its return phase. As will be noted, the output crank 76 is drawing the connecting rod 78 to the left to draw the work head 36 toward the left in its return motion. Similarly, the control rack 94 is driven by the speed-change crank 88 toward the right thereby to impart a counterclockwise rotation to the differental control gear 98 which is effective, as described above, to decrease the clockwise rotational speed of the spider 72.

During the return phase of the work head 36, when the mechanisms are set up for the production of a fifty-four inch garment bag, the work head is made to travel at a reduced speed. This is effected by the control means M which imparts a counterclockwise rotation to the differential control gear 98. The velocity D of the work head 36 during this return phase is defined by the following formulae:

$$\frac{2B-C}{2} = D$$

$$\frac{2B+C}{2} = A$$

Where $D<A$

From the foregoing, it will be appreciated that the drive and control means for the work head 36 of the bag making machine according to the preesnt invention provide cyclical movement of the work head 36 comprising a work phase and a return phase. At the point at which the work head 36 is directly above the work-receiving roller 26, the work head 36 is driven at a linear rate of speed which is equal to the surface speed of the work-receiving roller 26. After the completion of the work phase, the drive and control means are effective to reverse the direction of the movement of the work head 36 to bring it, through a return phase, to its starting position. In order to vary the length of bags which may be manufactured in the bag making machine according to the present invention, the velocity of the work head 36 during the return phase (and therefore the length of time of the return phase) is variable thereby to vary the amount of work material 10 which flows across the work-receiving roller 26 between successive work phases. Obviously, if the return phase is lengthened, a corresponding lengthening of the individual garment bags is produced since a longer flow of work material passes between successive perforation and sealing lines.

The present machine employs a work roller of thirty inch circumference such that the work head 36 engages the work-receiving roller 26 at the same point for each successive bag during the manufacture of the 30 inch garment bag. It will be seen in FIG. 17 that the work cycle and return cycle are of equal duration for the passage of material over the work-receiving roller 26. It will be further noted that the velocity of the work head 36 is identical to that of the material during the mid portion of the work phase such that it may be brought into working engagement as defined above. As seen in the graphs of FIGS. 16 and 17, the speed α of the material is given as $1/t$ and the speed β of the work head is given as $L/T$. The speed β equals the speed α during the work phase of the machine as indicated by the heavy lines in FIGS. 16 and 17. Contrasting FIG. 17 with FIG. 16, it is seen that although the velocity β of the work head equals the velocity α of the material during the work phase (during the contact period as indicated on the graph the work head may be engaged with the work-receiving roller 26), the velocity of the work head during the return phase may be varied. The amount of material as indicated which flows across the work-receiving roller 26 is considerably greater and similarly the number of rotations of the work-receiving roller during the return phase is greater in the graph of FIG. 16 than it is in the graph of FIG. 17. It will be realized that the graph in FIG. 16 is illustrative of the operations of the mechanisms as shown diagrammatically in FIGS. 14 and 15 while the graph of FIG. 17 is illustrative of the operations which are displayed in FIG. 13.

Reference will now be made to FIGS. 1 through 7 for a complete description of the garment bag roll perforating and sealing machine according to the present invention. The garment bag roll perforating and sealing machine, generally indicated by the numeral 110, is supported by a frame 112 including legs 112a and cross bars 112b which support the machine base 114 at approximately table height.

The differential gear drive G and the control mechanism M are housed within the gear box housing 116 which is mounted on the rearward portion of the machine. A first pair of uprights 118 extend upwardly from the base 114 to approximately the height of the drive shaft 48 of the gear unit. A pair of support beams 120, on either side of the machine 110, are pivotally mounted at 122 at the top of the uprights 118 and extend forwardly beyond the forward edge of the machine frame 112. At the forward end of the support beams 120 is mounted the roller shaft 30, which, as we have seen, supports the work-receiving roller 26. A hand wheel 26a is secured to the shaft 30, see FIG. 2, for the manual movement of the work-receiving roller 26 required to set up the machine. The support beams 120 provide movable mounting means for the work-receiving roller 26 such that it may be moved downwardly with respect to the work head 36 located thereat. An upward bias force is exerted on the support beams 120, and therefore on the work-receiving roller 26, by means of the pneumatic piston and cylinder unit 124 which is pivotally mounted on the frame 112 on the bracket 124a at the cross member 112b. The piston connecting rod 126 is secured to the support beam 120 to push same upwardly toward the work-receiving roller 26 such that the roller 26 is pressed against the idler rollers 32, 34 with the work material 10 held therebetween.

Figure 1:
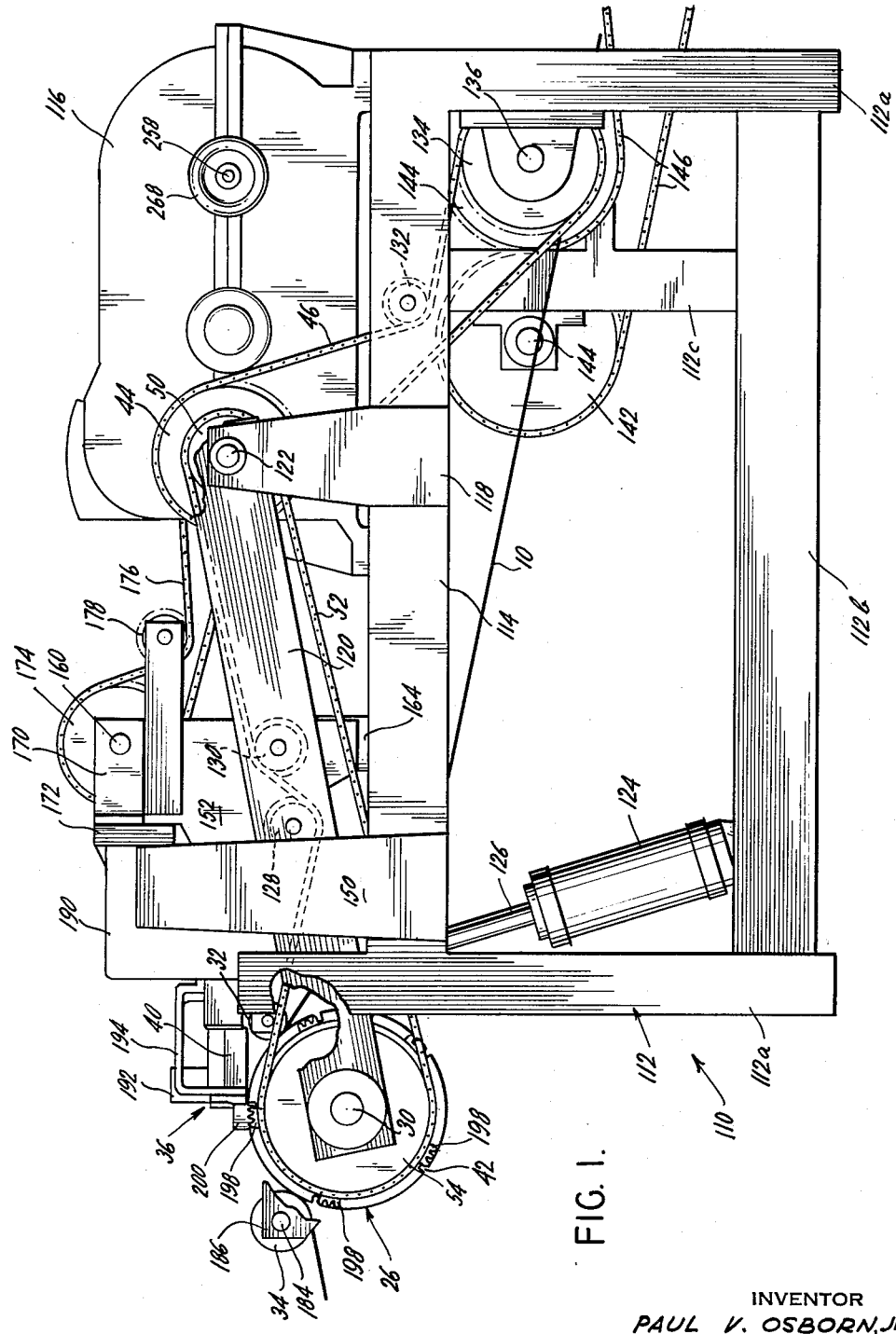
FIG. 1 is a side elevational view of a garment bag making machine according to the present invention with portions broken away and in phantom for the sake of clarity.

The pivot points 122 of the beam 120 on the uprights 118 are axially aligned with the input drive shaft 48 of the driving mechanisms. As described above and as may be seen in detail in FIG. 4, the sprocket 50 is mounted on the drive shaft 48 and the sprocket chain 52 is extended thereabout. At its forward end, the sprocket chain is engaged about the sprocket 54 mounted on the work-receiving roller 26 (FIG. 1). A pair of guiding idler sprockets 128, 130 are mounted on the support beam 120 to guide the sprocket chain 52 between the sprockets 50 and 54. It will be appreciated that the co-axial mounting of the pivots 122 with the input drive shaft 48 will allow the work-receiving roller 26 to be rotated about the pivot 122 without any interference from the driving means.

Figure 2:
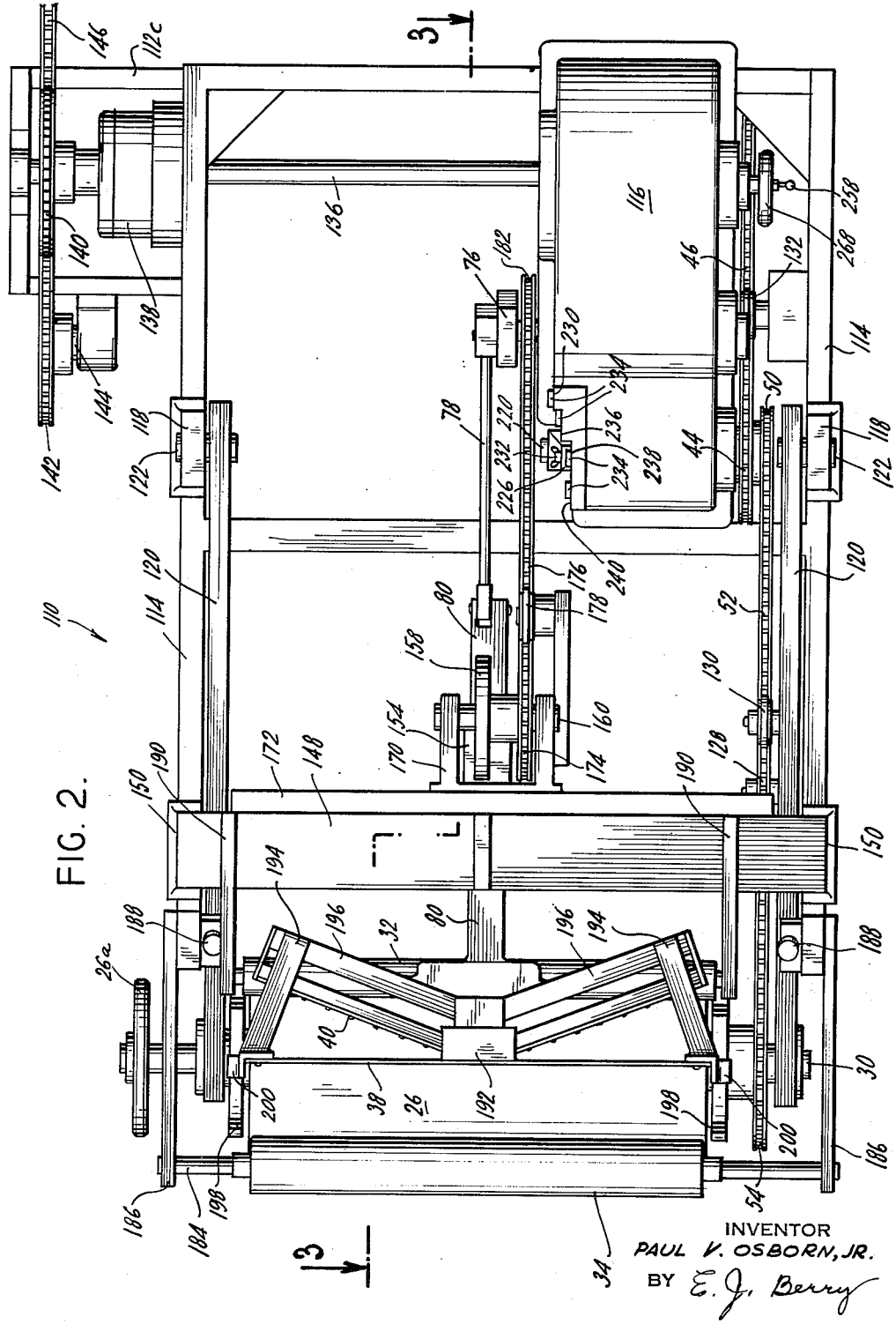
FIG. 2 is a plan view of the machine shown in FIG. 1.

The input drive shaft 48 is driven from the sprocket 44 which is in turn driven by the sprocket chain 46 extended downwardly below the level of the base 114, over the idler sprocket 132 and downwardly to a driven sprocket 134 which is mounted on the machine drive shaft 136. Reference to FIG. 2 will show that the machine drive shaft 136 is driven, through a clutch 138 which controls the over all operations of the machine 110, from a sprocket 140 suitably mounted for rotation on an extension 112c from the frame 112. Also mounted on the extension 112 is a second sprocket 142, on its shaft 144, over which is engaged the sprocket chain 146. The sprocket chain 146 is driven from a source external to the machine 110, such as from another machine which produces the work material 10. The sprocket 142 serves as an idler for the sprocket chain 146 which is engaged with the sprocket 140 about approximately 90 degrees of its periphery thereby driving the sprocket 140. Tracing the path of the sprocket chain 146, as best seen in FIG. 2, it enters immediately below the sprocket 140 and engages with approximately 25 percent of the periphery thereof. The chain goes upwardly around the sprocket 142 in a counterclockwise direction as viewed in FIG. 1 and then engages the sprocket 140 for approximately 90° of its periphery and then passes outwardly at the rear of the machine. The driving of the sprocket 140 drives the input of the clutch 138 which then in turn drives the machine drive shaft 136 which drives the input sprocket 46 by the sprocket 34.

As described above, the input sprocket 44 secured to the input drive shaft 48 is effective to drive the sprocket 50 thereby to impart power to the work-receiving roller 26, and, through the input drive shaft 38, to drive the differential gear unit G.

Figure 3:
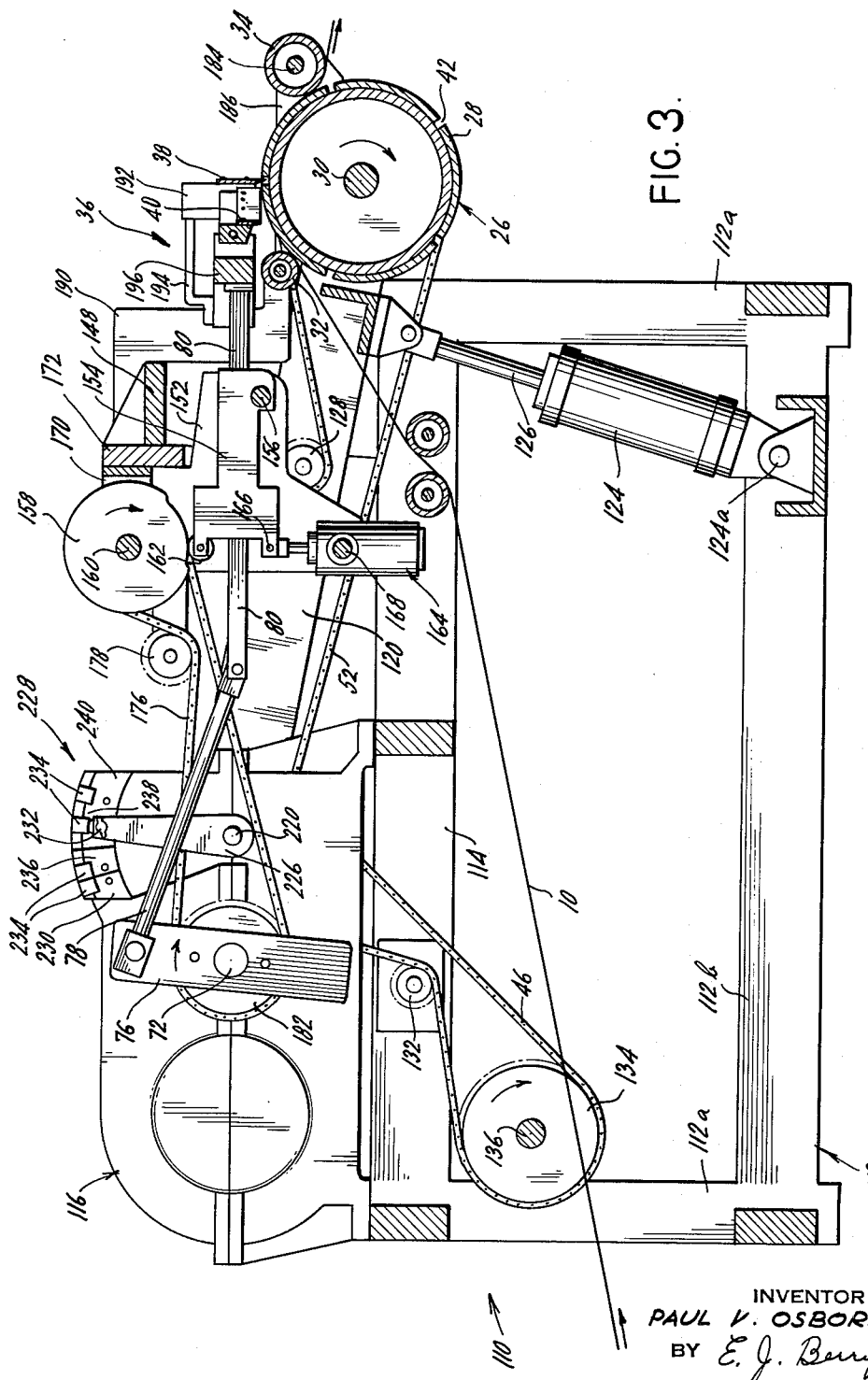
FIG. 3 is a sectional and elevational view taken along the line 3—3 of FIG. 2 and looking in the direction of the arrows.

Reference will now be made to FIGS. 1, 2 and 3 for a description of the mounting means for the slide beam 80 and the workhead 36. These mechanisms, which may be best seen in FIG. 3, are supported on a cross beam 148 which is mounted on the second pair of uprights 150 at the forward portion of the machine. Extending downwardly from the cross beam 148 is a mounting plate 152 on which is mounted the slide beam bearing and tilting member 154. The slide beam 80 passes through the member 154 which is provided with suitable smooth sliding surfaces to facilitate the reciprocating motion of the slide beam 80 and which is pivotally mounted at 156 to provide movement of the work head 36 in a direction transverse to its reciprocating movement. As has been described above, the output crank shaft 76 drives the connecting rod 78 and thereby the slide beam 80 through a reciprocating motion to drive the work head 36 tangentially of the work-receiving roller 26. Movement radially toward and away from the work receiving roller 26 is provided by rotation of the member 154 about its pivotal mount 156. It will be appreciated that when the member 154 is pivoted in a counterclockwise direction the work head 36 will be moved radially away from the work-receiving roller 26 and, conversely, the clockwise motion of the member 154 will bring the work head 36 downwardly into engagement with the work-receiving roller 26. The pivotal motion of the slide beam bearing and tilting member 154 is controlled by means of the cam 158 which is mounted for rotation on the shaft 160. A cam follower wheel 162 is pivotally mounted at the upward and rearward end of the member 154 and engages against the surface of the cam 158. At the lower and rearward end of the member 154 there is secured a pneumatic piston and cylinder assembly 164 which is pivotally connected to the member 154 at 166 and to the mounting plate 152 at the pivot 168. Pressure is constantly supplied to the piston and cylinder assembly 164 such that a clockwise bias is constantly exerted upon the member 154. The cam 158 is rotated in a one-to-one ratio with the work cycle of the head 36 and is so developed that during the greater portion of its rotational movement the work head 36 is lifted out of engagement with the work-receiving roller 26. During a relatively short portion of its total circumference, the cam 158 is cut away such that the member 154 is rocked about its pivot 156 in a clockwise direction thereby lowering the head 36. It will be appreciated that this lowering of the work head 36 occurs during the work phase of the complete machine cycle described above.

The cam 158, and its associated shaft 160, are mounted for rotation within the mounting bracket 172 which is secured to the support beam 170 which in turn is mounted on the cross beam 148 and upon the uprights 150. A sprocket wheel 174 (see FIG. 1) is secured to the shaft 160 such that when the sprocket 174 is driven, the cam 158 will similarly be driven. Drive is imparted to the cam sprocket 174 by means of the sprocket chain 176 which, after passing over the idler wheel 178, is extended to the driving sprocket 182. The driving sprocket 182 is mounted upon the shaft of the differential spider 72 immediately adjacent the crank arm 76 to produce the one-to-one relationship between the movement of the work head 36 and the cam 158 such that the work head 36 is moved downwardly during the work phase and is lifted upwardly out of engagement with the work receiving roller during the other portion of the work cycle.

Other mechanical members appear in FIGS. 1, 2 and 3 which serve to provide mechanical support and/or aid the operation of the previously described mechanisms. The exit idler roller 34 is mounted on the shaft 184 which is supported for rotation on two forwardly extending members 186 (see FIG. 2) from the frame 112. The idler roller 32 is supported on an extension of the support 190 as seen in FIG. 3. Adjacent the front portion of the frame 112 there are positioned a pair of adjustable stops 188 which engage the support beams 120 of the work-receiving roller 26 and hold same against the force exerted by the piston and cylinder assembly 124. The stops 188 may be adjusted such that on intimate rolling contact is made between the idler rollers 32, 34 and the work-receiving roller 26.

The specific constructions of the work head 36 may be best seen in FIG. 2 wherein it is seen that the perforating blade 38 is mounted on a block 192 which is secured at the forward end of the slide beam 80. The ends of the perforating blade 38 are supported by brackets 194 which are in turn mounted on supporting arms 196 which extend outwardly toward either side of the machine from the slide beam 180. The outwardly extending support arms 196 are arranged at the angle of the perforating blades 40 and serve to support those perforating blades between the mounting block 192 and the brackets 194.

Positive interengagement means are provided on the work head 36 and the work-receiving roller 26 to insure that the perforating blade 38, which extends below the working surface of the work-receiving roller 26, is reveived within the relatively narrow clearance slot 42. These mechanisms may be best seen in FIG. 1 wherein a plurality of toothed segments 198 are positioned about the periphery of the work-receiving roller 26 at either end thereof. The toothed segments 198 are positioned at the locations of the clearance slot 42. In the illustrative case of the garment bag manufacturing machine 110, these clearance grooves are provided at 72 degree intervals around the 30 inch circumference of the work-receiving roller such that each clearance groove is 6 inches from its next adjacent clearance groove. (It will be thus appreciated that garment bags of a length differing by amounts of 6 inches may be manufactured in the presently disclosed machine.) A pair of toothed gear segments 200, which match the toothed element 198 of the work-receiving roller 26, are mounted at the lower and outer ends of the brackets 194. When, during the work phase of the work head 36, the work head is brought into working engagement with the work-receiving roller 26, the toothed segments 200 will engage with their matching toothed segments 198 on the work-receiving roller 26 thereby insuring the accurate placement of the perforating blade 38 within the clearance grooves 48.

Referring now to FIGS. 4, 5, 6 and 7, a description will be given of the differential gear units G and the control mechanisms M which activate the interengaged motion of the work head 36 with the work-receiving roller 26. In this regard, the descriptions of FIGS. 13, 14 and 15 serve to provide a generalized summary of the functions and means employed in these drive and control mechanisms.

As recited above, power is introduced into the driving means by the driven sprocket chain 46 which is engaged about the sprocket wheel 44 which is in turn rigidly secured to the drive shaft 48. The drive shaft 48 is supported within the gear housing 116 on a pair of bearings 202 (see FIG. 6). The main drive gear 56 is mounted upon the drive shaft 48 and is splined thereto, as at 204 such that the gear 56 may be moved longitudinally along the shaft 48 but such that the rotation of the shaft 48 will rotate the gear 56. The mounting collar 206 for the gear 56 serves to provide a bearing surface for this sliding action and the annular recession 208 in the collar 206 provides means whereby the gear may be moved longitudinally along the shaft 48.

The idler and speed change gear 58, mounted on its shaft 210, is received for rotation within the rockable mounting arm 212 which, at its outer end, includes a bearing 214 for the shaft 210 and which, at its inner end, is rigidly secured to a shifting shaft 216. The shifting shaft 216 is mounted for movement along the length of the drive shaft 48 and for rotation about the axis of the drive shaft 48. At its rearward end, the shifting shaft 216 has a bearing portion 218 and its forwad end has a shaft section 220 which protrudes outwardly of the gear housing 116 through the opening 222. A bridge 224 connects the shaft portion 222 and the rear bearing portion 218 of the shifting shaft 216 providing a bridging means extending over and around the bearing 202 of the drive shaft 48. A shift lever 226 is secured at the end of the shifting shaft 216 externally of the side wall of the gear box 116.

It will be appreciated that as the shifting shaft 216 is rotated about its own axis, the rockable mounting arm 212 will be moved about the axis of the drive shaft 48. Similarly, as the shifting shaft 216 is moved axially, the rockable mounting arm 212 will similarly be moved axially due to its rigid interconnection with the shifting shaft 216. A small downward extension 212a of the arm 212, is intimately received within the annular recess 208 in the mounting collar 206 of the gear 56 and is effective to move the gear 56 axially with the mounting arm 212 and thereby with the idler and speed change gear 58. By this means, the main drive gear 56 is constantly engaged with the speed change gear 58. As may be best appreciated by viewing FIGS. 4 and 6, the speed change may be effected by moving the speed change gear 58 axially along the driveshaft 48 at the same time rotating the rockable mounting arm 212 about the drive shaft 48 thereby to bring the gear 58 into engagement with the various diameter driven gears 60, 62, 64. This gear shift procedure is facilitated by the gear shift handle 226 and its associated shifting mechanisms.

Figure 6:
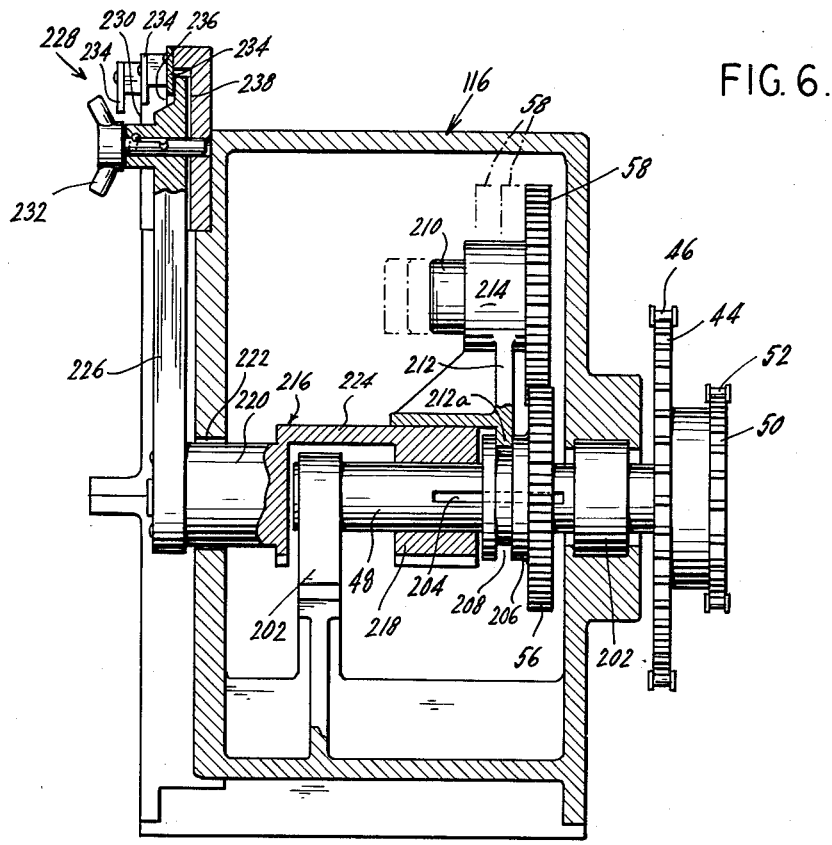
FIG. 6 is a sectional view taken along the line 6—6 of FIG. 5 illustrating the gear shift mechanism employed.

As shown in FIGS. 3 and 6, an indexing device 228 is provided on the external face of the gear box 168 to provide location means for the various positions of the gear shift handle 226. The indexing device 228 has four distinct positions. At step 230, seen in FIGS. 3 and 6, the handle 226 is positioned to engage the speed change gear 58 with the smallest driven gear 60. A clamping member 232 is provided to clamp the handle in that position and a retaining tab 234 is provided for positive interengagement. A second step 236 is provided adjacent the first step 230 and is positioned to move the rockable mounting arm 212 both rotationally and axially along the drive shaft 48 such that the speed change gear 58 is engaged with the second driven gear 62. A similar retaining member 234 is provided in that position. A third station 238 is provided in the indexing means 228 which is effective to locate the speed change gear 58 in engagement with the third driven gear 64. It is at this third station 238 that the handle 226 is located in the drawings. A fourth or neutral station 240 is provided. In its neutral position, the shifting mechanisms are located at the same axial location with respect to the drive shaft 48, i.e. the speed change lever 58 is coplanar with the driven gear 64, but the speed change gear 58 is moved completely out of engagement with any one of the driven gears 60, 62, 64. It will be appreciated that in the neutral position the work-receiving roller 26 will be driven through the driving sprocket 52. However, no motion will be imparted to the differential gear unit G and thereby, no movement would be imparted to the work head 36.

As described above in connection with FIGS. 13, 14 and 15, the gears 60, 62, 64 are mounted on the shaft 66 which is mounted for rotation in bearings 242 and 244. At the other side of the differential, the spider 72 is mounted for rotation in the bearing 246 at its outer end, and at its inner end in the ball bearing 248 shown partially in section in FIG. 4, which is mounted within the first differential side gear 68. Of course, the extending arms 72a of the spider 72 provides bearing surfaces for the rotatable mounting of the differential pinion gears 70. An internal bearing which is not shown but which is similar to the bearing 448 is provided within the second differential side gear 74 to provide a rotatable mounting for that second differential side gear as well as for the differential control gear 98. Thus, a complete set of bearings and appropriate mountings are provided for the differential gear unit G as described above.

Figure 4:
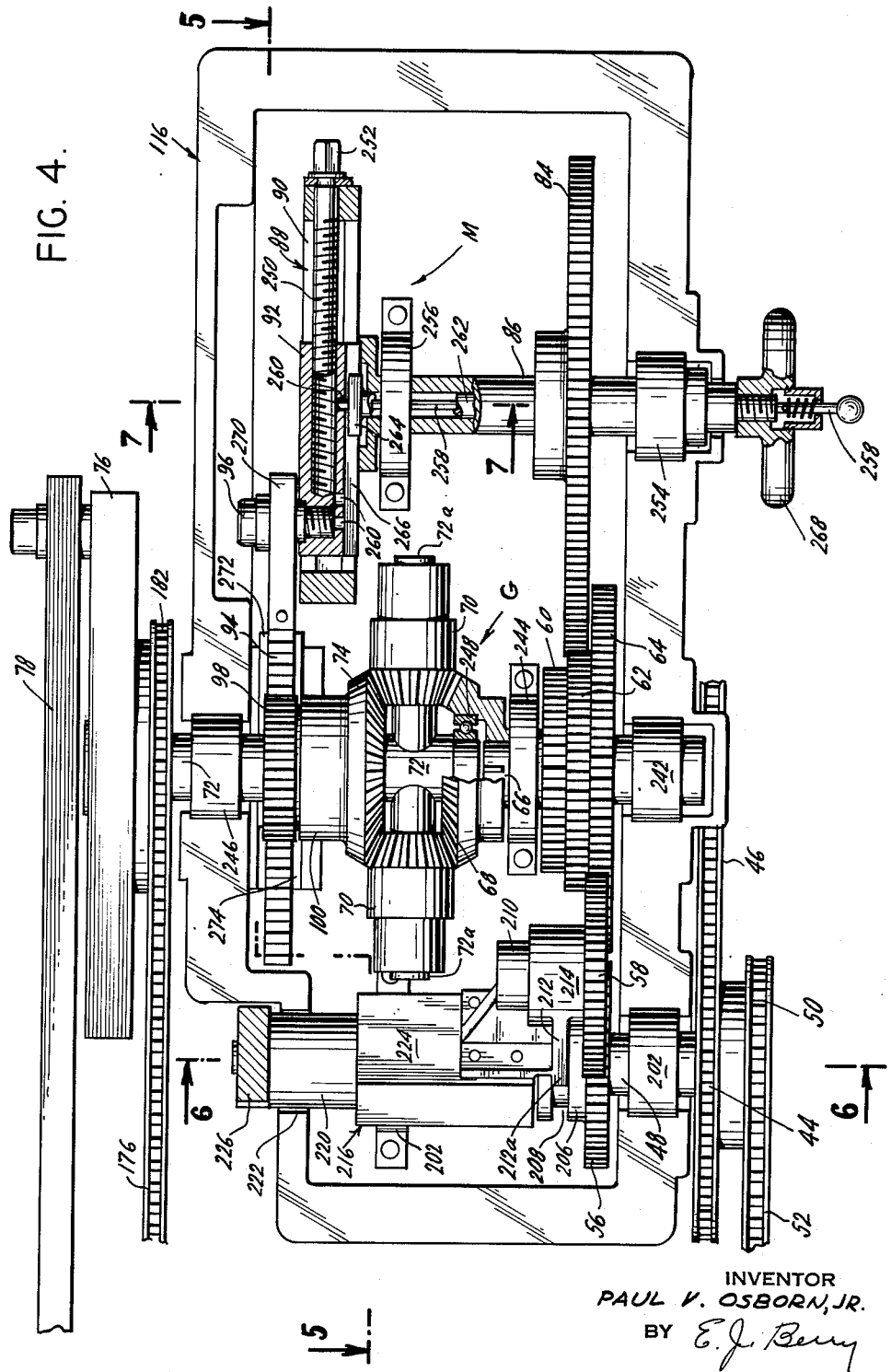
FIG. 4 is a plan view of the gear box of the present machine with its cover removed thereby to see the internal mechanisms with portions thereof broken away and in section for the sake of clarity.
Figure 5:
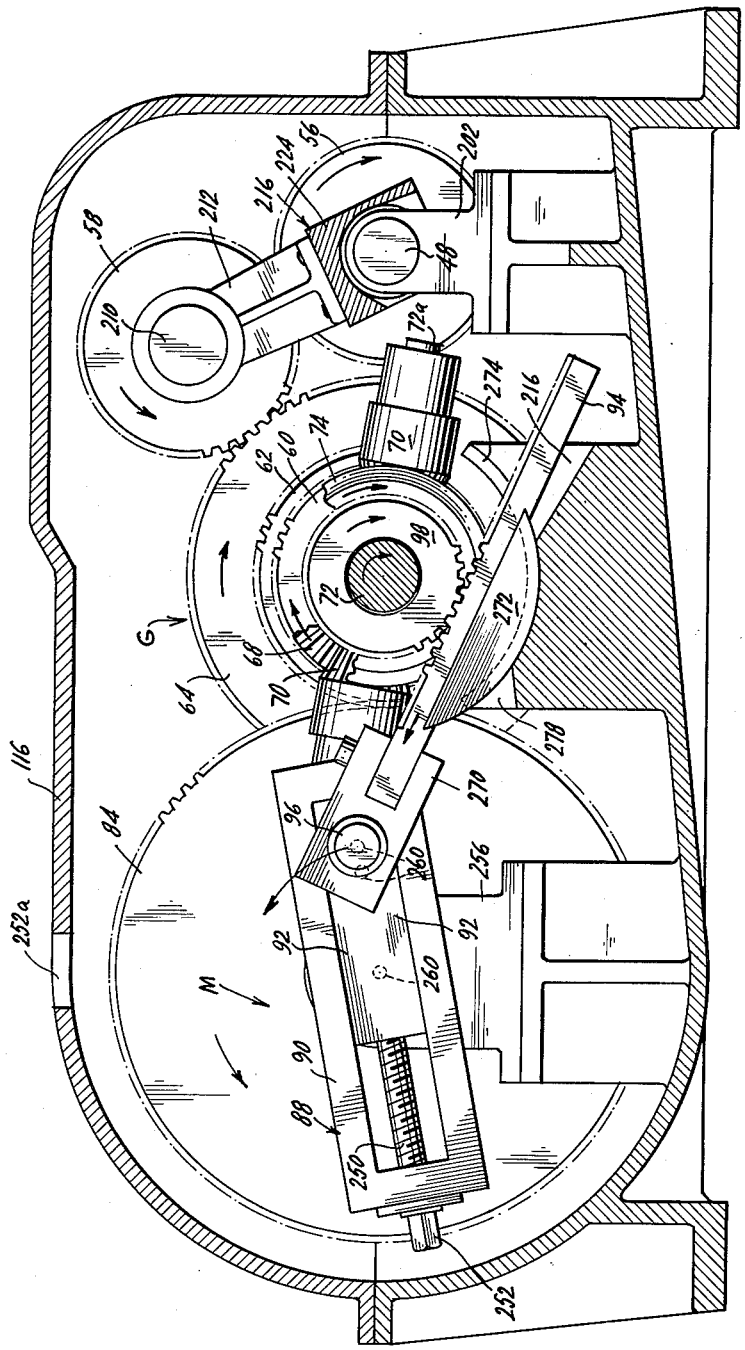
FIG. 5 is a sectional view of the gear box taken along the line 5—5 of FIG. 4 and looking in the direction of the arrows illustrating the control means employed in the machine.
Figure 7:
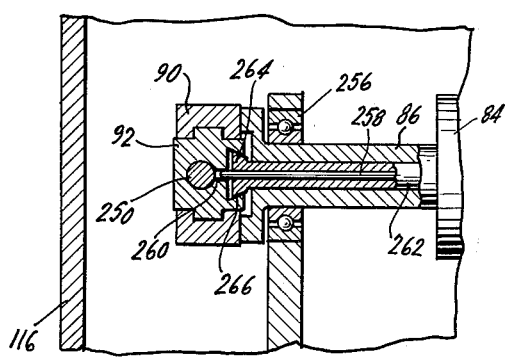
FIG. 7 is a sectional view taken along the line 7—7 of FIG. 4 illustrating the adjustment means employed to vary the return phase of the manufacturing operation by adjustment of the control means.

Reference will now be made to FIGS. 4, 5 and 7 for a description of the specific mechanisms of the control means M. In FIG. 5, the adjustable block 92 is shown positioned within the frame 90 of the speed-change crank 88. A crank throw adjustment screw 250 is provided interconnecting the block 92 with one end of the frame 90 and the adjustment head 252 at the end of the screw 250 provides means for the turning of the adjustment screw 250. It will be appreciated that as the screw 250 is rotated in a clockwise direction, the effective crank arm length of the speed-change crank 88, i.e. the distance between the pivot 96 of the control rack 94 and the center line of the shaft 86 will be decreased. An access opening 252a is provided in the housing 116 for adjustment of the screw 250.

The control means within the adjustment means M are best seen in FIGS. 4 and 7. It will be seen that the speed change crank shaft 86 is mounted for rotation on the bearings 254, 256. Since the length of the effective crank arm of the speed change crank 88 is critical for the proper workings of the machine 110, a spring loaded locating pin 258 is provided coaxially within the speed change crank shaft 88 to engage with the locating holes 260 which are provided at set locations along the length of the adjustment block 92 to enable the operator of the machine 110 to determine the exact and proper placement of the block 92 within the frame 90. When the operator has moved the block 92 to the proper location as defined by the reception of the locating pin 258 within the locating holes 260, it is clamped into secure engagement with the frame 90 by means of the clamping rod 262 (see FIG. 7) which is located coaxially about the locating pin 258 and coaxially within the speed-change crank shaft 88. At the end of the clamping rod 262 there is provided a wedge shaped member 264 which is received within a negative opening 266 of identical shape within the inner face of the adjustment block 92. It will be appreciated that as the clamping rod 262 is drawn to the right in FIG. 7, or downwardly in FIG. 4, the wedge shaped member 264 will engage the negative slot 262 in the adjustment block 92 thereby clamping the block 92 within its set position in the speed-change crank frame 90. This clamping action is provided by the locking wheel 268 (FIG. 4) on the outer face of the gear box 116 which is connected by screw threads to the clamping rod 262. As the locking wheel 268 is turned with respect to the clamping rod 262 (prevented from rotating by its interengagement with the negative slot 266) the inner end of the locking wheel 268 engages against the outer end of the speed-change crank shaft 86 thereby drawing the clamping rod 262 outwardly with respect to the crank shaft 86, thus, clamping the wedge 264 within the negative slot 266.

The mounting and bearing means for the speed control rack 94 are best seen in FIG. 5. A mounting block 270 rigidly secured to one end of the control rack 94 is pivoted to the adjustment clock at pivot 96. The bearing means which support the sliding and rotating movement of the rack 94 as it is moved by the speed-change crank 88 comprise the chord-wise circular bearing segment 272 which has in its upper surface a linear bearing groove to receive the lower edge of the control rack 94. In its lower edge there is formed a recessed circular bearing surface which is adapted to receive the upwardly facing circular bearing and support 274. It will be appreciated that as the rack 94 is moved the active individual teeth of the rack 94 remain at a fixed radial location with respect to the differential control gear 98. As the rack 94 is moved by the speed-change crank 88, the bearing segment 272 provides for sliding movement with respect thereto by the rack 94 and further itself moves along the upwardly facing circular bearing 274 to provide the required support for the rack 94. It will be seen that the gear box 116 and specifically, the portion thereof which supports the bearing 274 is cut away at 276 and 278 to provide clearance for the movement of the rack 94.

A brief description will now be given of the operations of the machine 110 in order to convey a more complete understanding of the present invention. Before the insertion of work material 10 into the machine, the operator selects the desired bag length by manipulation of the gear speed lever 226 of the indexing mechanism 228. The machine is operated at a slow speed to check the accurate alignment of the work head 36 with the grooves 42 and the work-receiving roller 26. A length of work material 10 is then threaded through the machine between the idler wheels 32, 34 and the work-receiving roller 26 (see FIG. 3). This threading operation is accomplished by lowering the work-receiving roller 26 on the beams 120 by deactivating the piston and cylinder assembly 124. The clutch 138 is deactivated thereby allowing the operator to rotate the work-receiving roller 26, by means of the hand wheel 26a, to facilitate the threading operations. When the work meterial 10 is placed in position, the clutch 138 may be reengaged and the work-receiving roller 26 raised into its elevated position as shown in the drawings. In addition, prior to the start of manufacturing operations, the heating elements associated with the sealing bar are activated to raise the sealing bar 36 to its proper temperature.

Production is commenced by engaging the clutch 138 such that power may be transmitted from the input sprocket chain 146 through the clutch 138 to the various rotating elements of the machine 110. The work material 10 is transmitted through the machine over the work-receiving roller 26 and the work head 36, driven as described in detail above, is alternately moved into and out of engagement with the work material as it passes over the work-receiving roller. With each cycle of the machine, the work head 36 produces a line of perforations 20 and sealed shoulder lines 22 as shown in FIG. 8 to produce a plurality of end to end attached garment bags 12. The various operating mechanisms of the machine are all interlinked such that the overall speed of the machine may be controlled by the speed of the input movement supplied through the input sprocket chain 146. In this manner, the operations of the machine 110 may be controlled by the operations of an associated machine, such as that which manufactures the heat sealable tubing of the work material 10, or alternatively, by a simple speed control on a driving motor.

It will be appreciated that there is provided in accordance with the present invention a garment bag roll perforating and sealing unit which efficiently and quickly produces a series of garment bags from a continuous length of heat sealable tubing. The machine according to the present invention is constructed such that bags of differing lengths may be manufactured on the same machine with relatively simple adjustments being made to the driving and control mechanisms.

A latitude of modification, change and substitution is intended in the foregoing disclosure and in some instances some features of the invention will be employed without a corresponding use of other features. Accordingdly, it is appropriate that the appended claims be construed broadly and in a manner consistent with the spirit and scope of the invention herein.

What I claim is:

1. A machine for the continuous-flow manufacture of garment bags from thermoplastic film tubing comprising means for advancing said tubing through said machine at a prescribed linear velocity, a work-receiving roller, means mounting said roller for rotation at a surface velocity equal to said prescribed linear velocity, a perforating and sealing head including perforating and sealing blades, means mounting said head for compound movement having motion components tangentially and radially of said roller, the peripheral surface of said roller having a plurality of equally spaced longitudinal clearance grooves formed therein providing clearance for said perforating blade, and actuating means for moving said head at the surface velocity of said roller and simultaneously moving said head radially of said roller into a cooperating working relationship therewith to contact said tubing between said head and said roller with said perforating blade aligned with said clearance grooves to perforate and seal said tubing for forming individual garment bags.

2. A machine for the continuous-flow manufacture of garment bags from thermoplastic film tubing comprising a work-receiving roller, means mounting said roller for rotation at a prescribed surface velocity, means for guiding said tubing into engagement with said work-receiving roller, a perforating and sealing head including perforating and sealing blades, means mounting said head for compound movement having motion components tangentially and radially of said roller, the peripheral surface of said roller having a longitudinal clearance grove formed therein providing clearance for said perforating blade, and actuating means for moving said head at the surface velocity of said roller and simultaneously moving said head radially of said roller into a cooperating working relationship therewith to contact said tubing between said head and said roller with said perforating blade aligned with said clearance groove to perforate and seal said tubing for forming individual garment bags.

3. A machine for performing a work function on a continuous length of material comprising means for transporting said material through said machine including a work-receiving roller and drive means to rotate said work-receiving roller at a prescribed surface velocity, a work head, means mounting said head for movement into tangential engagement with said material at said work-receiving roller, drive means for driving said head through a work cycle including a work phase wherein said head moves tangentially with said work-receiving roller at the surface velocity thereof and a return phase at a variable velocity, and control means for said drive means for driving said head at the surface velocity of said work-receiving roller during the work phase and for varying the velocity of said head during said return phase thereby to vary the total length of time of said return phase thereby varying the distance along said work material of successive engagements of said head with said work material.

4. A machine for performing a work function on a continuous length of work material comprising means for transporting said work material through a feed path in said machine at a prescribed linear velocity, a work head, means mounting said work head for compound movement having components parallel to and perpendicular to said feed path for periodic engagement with said work material as it is moving along said feed path, and a variable drive and control means to drive said work head including a drive crank, a connecting rod pivotally secured to said drive crank and to said work head, means to rotate said drive crank including a differential gear unit having first and second differential side gears, a spider connected to said drive crank, differential pinion gears mounted on said spider, and power input means to drive said differential side gear to rotate same at a prescribed rotational velocity, said control means being connected to the second differential side gear of said differential gear unit for rotating the same at prescribed velocities during the cyclical movement of said work head, said control means including an adjustable crank having a variable crank arm length, a rack connected to said adjustable crank and interconnected with said second differential side gear, and control drive means from said power input for rotating said adjustable crank and thereby said second differential side gear for driving said head at the linear velocity of said surface during a work phase and for varying the velocity of said head during a return phase to vary the total length of said return phase thereby varying the distance along said work material of successive engagements of said head with said work materials.

5. A machine for performing a work function on a continuous length of work material comprising means for transporting said work material through a feed path in said machine at a prescribed linear velocity, a work head, means mounting said work head for compound movement having components parallel to and perpendicular to said feed path for periodic engagement with said work material as it is moving along said feed path, a work-receiving roller, means rotating said roller at said linear velocity for interengagement with said material and said work head, and a variable drive and control means to drive said work head including a drive crank, a connecting rod pivotally secured to said drive crank and to said work head, means to rotate said drive crank including a differential gear unit having first and second differential side gears, a spider connected to said drive crank, differential pinion gears mounted on said spider, and power input means to drive said differential gear unit connected to said first differential side gear to rotate same at a prescribed rotational velocity, said control means being connected to the second differential side gear of said differential gear unit for rotating the same at prescribed velocities during the cyclical movement of said work head, said control means including an adjustable crank having a variable crank arm length, a rack connected to said adjustable crank and interconnected with said second differential side gear, and control drive means from said power input for rotating said adjustable crank and thereby said second differential side gear for driving said head at the linear velocity of said surface during a work phase and for varying the velocity of said head during a return phase to vary the total length of said return phase thereby varying the distance along said work material of successive engagements of said head with said work material.

(References on following page)

References Cited by the Examiner

UNITED STATES PATENTS

| | | | |
|---|---|---|---|
| 2,301,543 | 11/42 | Hlauaty | 74—117 |
| 2,399,493 | 4/46 | Luehrs et al. | 74—394 |
| 2,737,860 | 3/56 | Randall | 93—35 |
| 2,791,160 | 5/57 | Burrell | 93—35 |
| 2,884,988 | 5/59 | D'Angelo | 156—583 |
| 3,015,967 | 1/62 | Bancroft | 74—394 |
| 3,028,294 | 4/62 | Histed | 156—583 |
| 3,053,723 | 9/62 | Plach et al. | 156—515 |

EARL M. BERGERT, *Primary Examiner.*

FRANK E. BAILEY, DOUGLAS J. DRUMMOND,
*Examiners.*